United States Patent [19]

Credle, Jr.

[11] Patent Number: 5,127,431
[45] Date of Patent: Jul. 7, 1992

[54] FLOW CONTROL SYSTEM FOR A BEVERAGE DISPENSER

[75] Inventor: William S. Credle, Jr., Stone Mountain, Ga.

[73] Assignee: The Coca-Cola Company, Atlanta, Ga.

[21] Appl. No.: 697,131

[22] Filed: May 8, 1991

[51] Int. Cl.⁵ .............................................. G05D 7/01
[52] U.S. Cl. ...................... 137/504; 251/186
[58] Field of Search .......................... 137/504, 625.38; 251/186, 190

[56] References Cited

U.S. PATENT DOCUMENTS

| | | | |
|---|---|---|---|
| 363,872 | 5/1987 | Williard | 251/186 |
| 1,498,689 | 6/1924 | Heginbottom | 92/235 |
| 2,380,022 | 7/1945 | Burt | 251/186 X |
| 2,970,804 | 2/1961 | Busby et al. | 251/190 X |
| 3,136,336 | 6/1964 | Priesmeyer | 251/190 X |
| 3,412,752 | 11/1968 | Gordon et al. | 137/504 X |
| 3,421,542 | 1/1969 | Adams et al. | 137/504 |
| 3,422,842 | 1/1969 | Erickson | 137/504 |
| 4,473,088 | 9/1984 | Dotter | 251/186 X |
| 4,648,424 | 3/1987 | Takahashi et al. | 137/504 |

*Primary Examiner*—Stephen M. Hepperle
*Attorney, Agent, or Firm*—Lynne R. O'Brien; Thomas R. Boston; W. Dexter Brooks

[57] ABSTRACT

A piston-sleeve assembly for a flow control for a beverage dispenser in which the piston and sleeve are preferably injection molded. A rolling diaphragm provides a seal between the piston and sleeve. The piston includes flow control pads biased into contact with the sleeve.

3 Claims, 3 Drawing Sheets

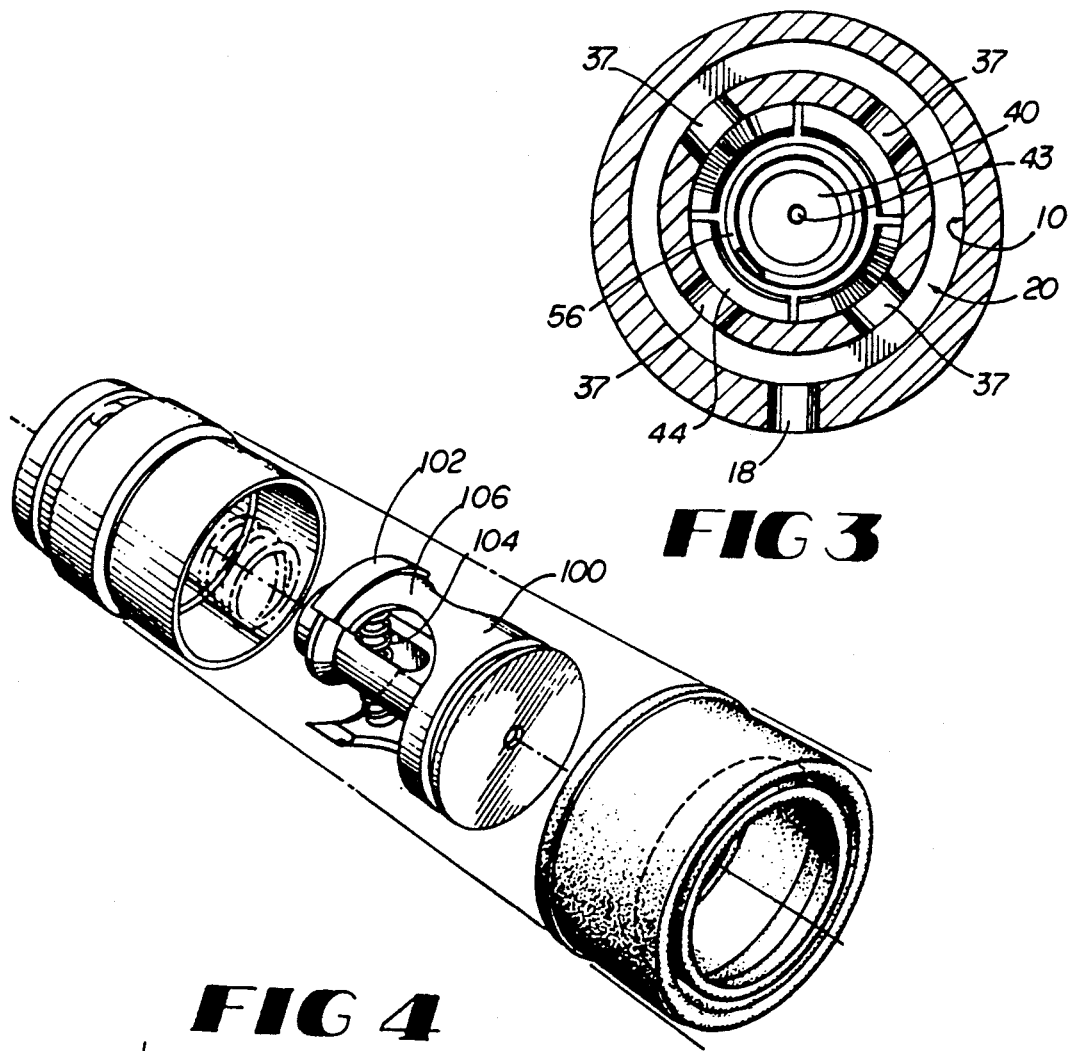
FIG 3
FIG 4
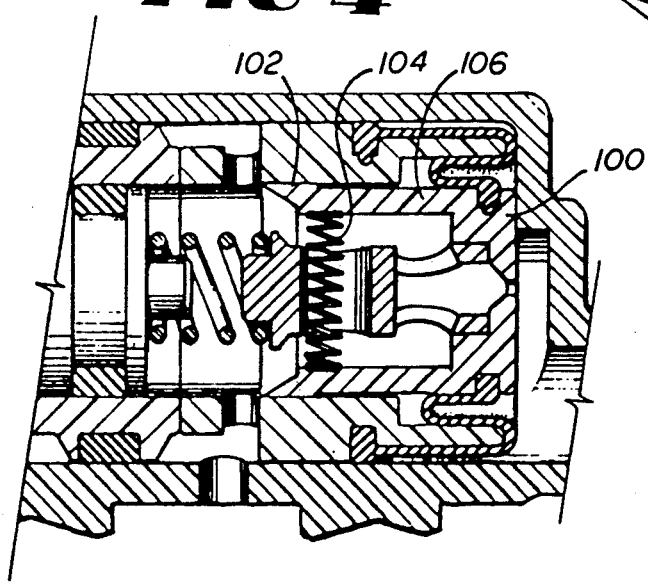
FIG 5

5,127,431

FLOW CONTROL SYSTEM FOR A BEVERAGE DISPENSER

BACKGROUND OF THE INVENTION

1. Field of Invention

This invention relates to beverage dispensing and in particular to a method and apparatus for controlling liquid flow, such as of syrup and of carbonated water.

2. Description of the Prior Art

Flow controls for postmix beverage dispensers are well-known. Two flow controls are commonly located in each dispensing valve of a beverage dispenser and are pressure compensated devices to control the syrup and soda flow rates through the valve to control, in turn, the ratio of syrup to water in the final beverage. These flow controls usually include piston-sleeve assemblies machined out of stainless steel or ceramic to very close tolerances. These known flow controls have certain disadvantages. They are expensive to machine; they leave an annular space between the piston and sleeve which allows leakage; they are subject to binding when a particle gets between the piston and sleeve; and a relatively large force is needed to move the piston if the large surface area between the piston and the sleeve becomes scratched.

Takahashi et al. (U.S. Pat. No. 4,648,424) disclose a liquid flow controller having a casing in which a valve body is slidably accommodated.

Erickson (U.S. Pat. No. 3,422,842) discloses an adjustable flow control device having a hollow piston slidably and loosely mounted within an associated casing and having a substantially friction free diaphragm for eliminating the by-passing of fluid about the exterior of the piston.

Heginbottom (U.S. Pat. Nos. 1,498,689 and 1,441,082) discloses a piston with resilient guide members which are connected to a disk-shaped portion of the piston head.

SUMMARY OF THE INVENTION

The flow control of the preferred embodiment of the present invention includes a piston-sleeve assembly which includes a piston and a sleeve injection molded out of plastic (preferably acetal) and a rolling diaphragm with an annular bead at each end received in a corresponding groove in each of the piston and sleeve. As installed, the annular beads are located on the inside diameter of the proximal end of said diaphragm and on the outside diameter of the distal end of said diaphragm, respectively. The sleeve is hollow and has a plurality of outlet ports therethrough.

The piston includes a piston head with a liquid inlet opening therethrough and one or more flow control elements connected to the head. The piston is slidably disposed for reciprocating movement within the hollow sleeve. Preferably the flow control element includes an arm extending substantially perpendicular from the piston head with a flow control pad on the free end which is biased into sealing engagement with the sleeve for controlling the flow of liquid through the sleeve outlet ports.

It is an object of this invention to provide a less expensive flow control with a piston and sleeve which are molded out of plastic.

It is another object of the present invention to provide a flow control which eliminates fluid by-pass and binding.

It is a further object of this invention to provide an improved flow control which overcomes some of the above-mentioned problems in the prior art.

It is still a further object of this invention to provide a flow control piston which actually contacts the sleeve resulting in less fluid leakage.

It is another object of this invention to provide a flow control that is not adversely affected by particles or contaminants.

It is another object of this invention to provide a flow control which minimizes friction because of less area of contact between the piston and sleeve and because of the use of highly lubricating plastic.

BRIEF DESCRIPTION OF THE DRAWINGS

The present invention will be more fully understood from the detailed description below when read in connection with the accompanying drawings wherein like reference numerals refer to like elements, and wherein:

FIG. 3 is a cross-sectional view taken along line 3—3 of FIG. 2.

FIG. 4 is an exploded perspective view of an alternate embodiment of the flow control.

FIG. 5 is a cross-sectional view of the alternate embodiment of the flow control of FIG. 4 as installed in a beverage dispensing valve.

DETAILED DESCRIPTION OF THE PREFERRED EMBODIMENT

Figure 1:
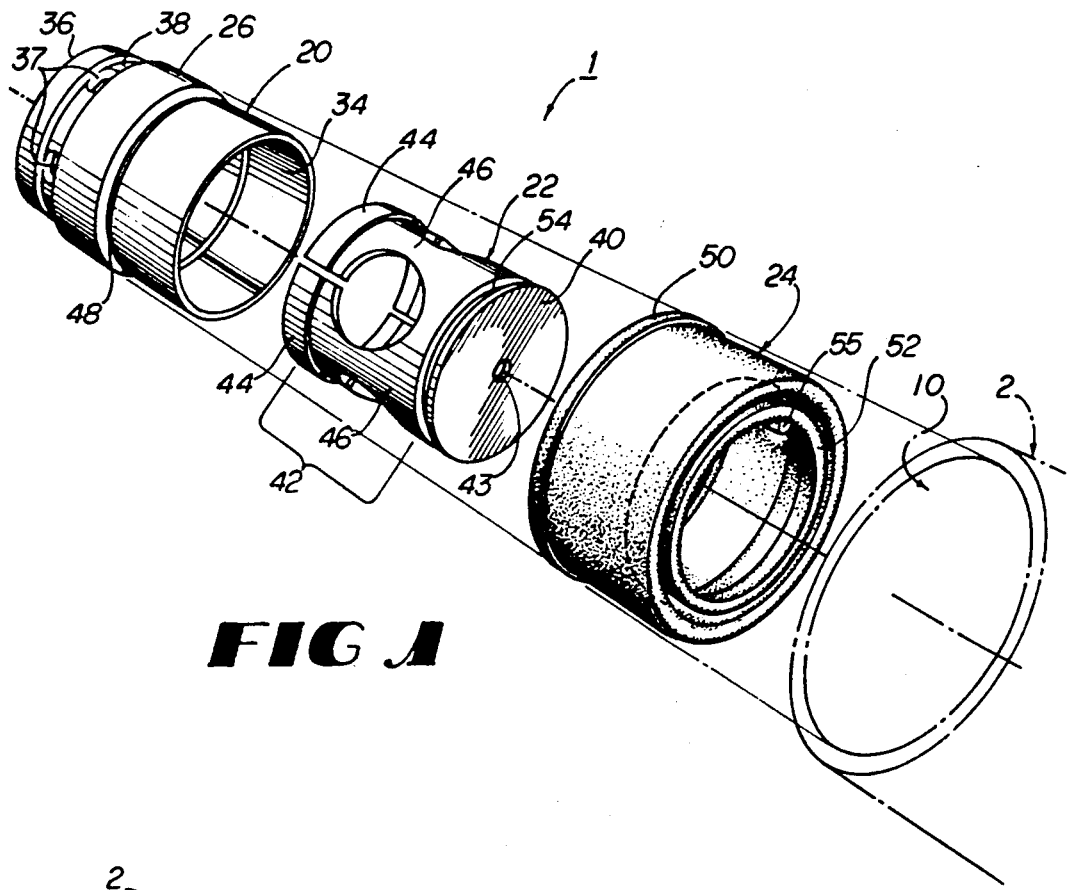
FIG. 1 is an exploded perspective view of the flow control of this invention.
Figure 2:
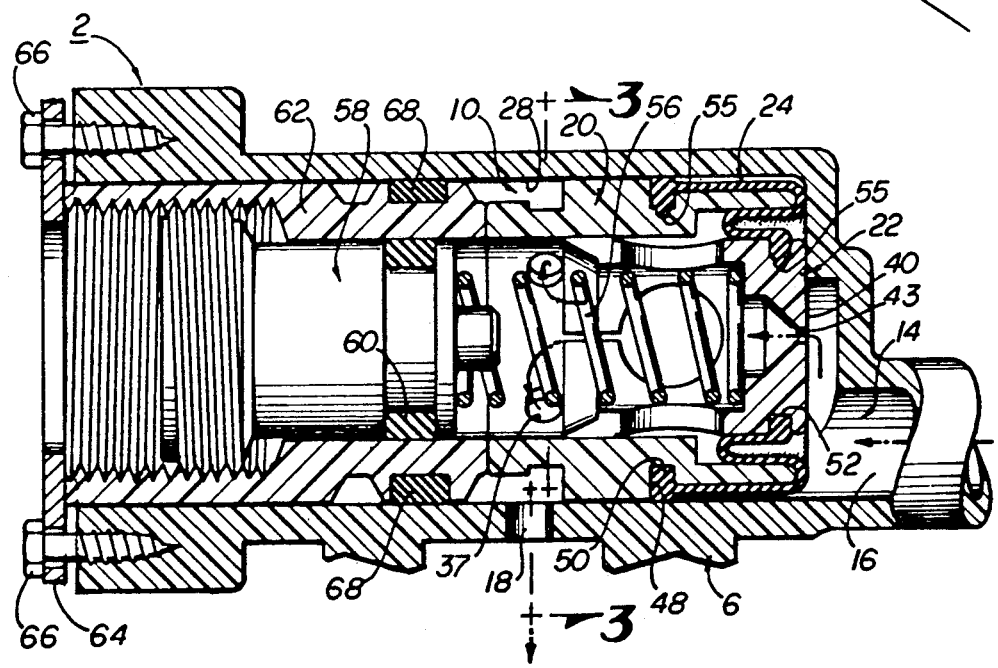
FIG. 2 is a cross-sectional view of the flow control of FIG. 1 as installed in a beverage dispensing valve.

With reference now to the drawings, FIGS. 1-2 show the piston-sleeve assembly 1 for a flow control 2 of the present invention.

The flow control 2 is shown in FIG. 2 as installed within a body 6 having a flow control chamber 10. The chamber 10 can be in any desired portion of a beverage dispenser; it is typically inside a beverage dispensing valve (only a portion of which is shown). The body 6 includes a water passageway 14 (a postmix dispenser will also have a similar syrup passageway—not shown) in communication with the flow control chamber 10 which includes an inlet port 16 and an outlet port 18.

As shown in FIGS. 1 and 2, the piston-sleeve assembly includes a sleeve 20, a piston 22 adapted for reciprocal movement within the sleeve 20, and a rolling diaphragm 24 for providing a seal between the sleeve and the piston. The diaphragm 24 also provides a seal between the sleeve and the flow control chamber 10 although this is not essential; a separate seal can be used between the sleeve and the wall of the chamber. The sleeve 20 preferably has an outer cylindrical surface 26 that provides a sliding fit inside of a cylindrical surface 28 of the flow control chamber 10.

The sleeve 20 is hollow and open at both ends 34 and 36. The proximal end 34 is disposed adjacent to the water inlet port 16 of the body 6, and the distal end 36 is disposed adjacent the outlet port 18 of the body 6. The sleeve 20 includes a plurality of openings 37 (preferably circular) through the sidewall 38 adjacent the distal end 36 of the sleeve 20. By controlling the liquid flow rate through the openings 37, the flow rate through the water passageway 14 is controlled.

The piston 22 includes a piston head 40 and flow control elements 42. The head 40 has an outer diameter smaller than the inner diameter of the sleeve 20 to reduce friction and drag. The head includes a liquid inlet opening 43 preferably centrally located therein. The flow control elements each include a pad 44 and an arm 46 connecting the pad to the piston head. In the preferred embodiment there is one pad for each arm and there are four outlet openings 37 and four pad-arm flow control elements.

The pad has a size just large enough such that it can completely overlie the opening 37. The pad is the only part of the piston that contacts the inside surface of the sleeve 20 to minimize drag and friction, while providing a closer fit than in known flow controls. The pad is in contact with the sleeve. When the pad is molded (or otherwise made) it is to be moved either radially inwardly or outwardly to contact the interior sleeve wall, and it is given such shape in the mold so that when it reaches its final position against the sleeve wall it will be congruent exactly to the wall surface to provide contact therewith.

To prevent the flow of water from the water passageway 14 around the exterior of the piston 22, a rolling diaphragm 24 is provided to movably seal the piston 22 to the sleeve 20. The sleeve 20 is provided with an annular groove 48, and an integral sealing bead 50 of the diagram 24 fits into the groove 48. The sealing head 50 doubles as an o-ring sealing the sleeve to the body, although this is not essential and a separate o-ring could be used with the sealing bead on an inside surface of the sleeve. A sealing bead 52 on the proximal end of the diaphragm 24 fits into an annular groove 54 on the piston 22. A nib or tab 55 is located on both the proximal and distal end of the diaphragm 24, orienting said pad 44 axially in-line with said opening 37.

As shown in FIG. 2, the piston 22 is biased against the action of liquid pressure from the inlet 14 by a coil spring 56 which is seated at one end against the piston head 40 of the piston 22 and at the other end against an adjusting screw 58. To prevent the flow of fluid around the adjusting screw 58, an o-ring 60 is provided. The adjusting screw 58 is threadably installed in an adjusting sleeve or body 62 held in place by a retainer plate 64 and screws 66 and having an o-ring 68. The adjusting screw and body are known in flow controls. The adjusting sleeve or body has one or more ears or tabs that are received in a slot in the body 6 to keep it from turning, as is known in the art.

FIG. 3 shows the four separate pads 44 of the preferred embodiment of the invertion.

FIGS. 4-7 show additional embodiments of the invention.

FIGS. 4 and 5 show another embodiment of a piston 100 having two pads 102 which are made with an outer diameter preferably equal to the inner diameter of the sleeve, (although the diameter of the pads can be larger or smaller) and which includes a compression spring 104 to force the pads into contact with the sleeve. The arms 106 provide the necessary flexibility.

Figure 6:
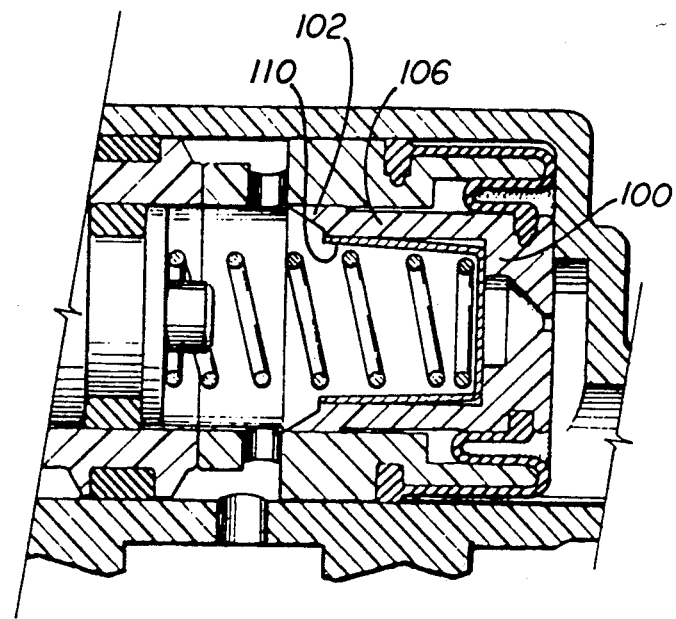
FIG. 6 is a cross-sectional view of second alternate embodiment of the flow control as installed in a beverage dispensing valve.

FIG. 6 shows another embodiment, similar to FIGS. 4 and 5, but which uses a leaf spring 110 instead of a compression spring to force the pads into contact with the sleeve.

Figure 7:
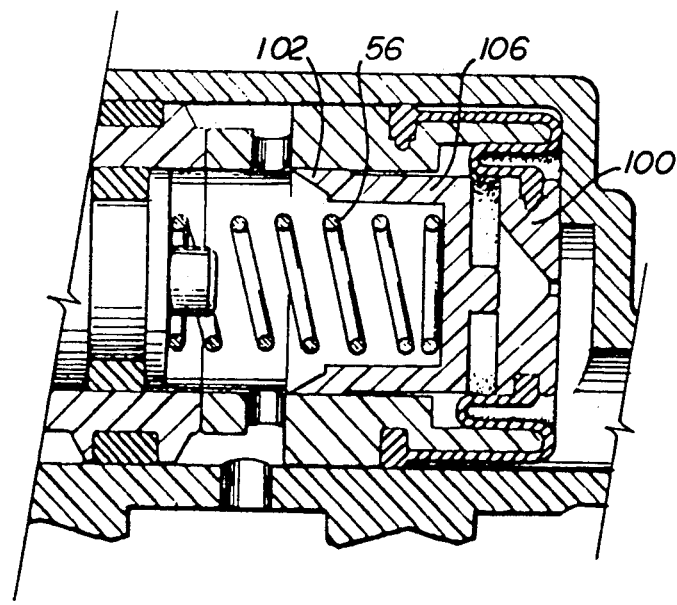
FIG. 7 is a cross-sectional view of a third alternate embodiment of the flow control as installed in a beverage dispensing valve.

FIG. 7 shows another embodiment which uses the adjusting spring 56 itself to also provide the outward biasing force on the pads.

While the preferred embodiment of this invention has been described in detail, it is to be understood that variations and modifications can be made therein without departing from the spirit and scope of the present invention as set forth in the appended claims. For example, while the piston and sleeve are preferably plastic and made by injection molding, they may be made in any desired way and can even be metal. The number and size of the flow control elements i.e. the pad and arms can vary greatly. It is not necessary to have one pad per arm, there could be two or more pads per arm or alternatively two or more arms per pad. The arms can have any desired shape and can attach to the piston head at any desired location. When using a separate spring to bias the pads outwardly, any type, size and shape spring can be used and of any material.

What is claimed is:

1. A method for controlling the flow of a liquid in a beverage dispenser comprising the steps of:
    (a) providing a beverage dispenser with a flow control chamber having a liquid inlet opening and a liquid outlet opening;
    (b) providing a piston-sleeve assembly in said chamber;
    (c) providing said sleeve of said piston-sleeve assembly with a sidewall, an open proximal end, and at least one liquid outlet opening through said sidewall;
    (d) providing said piston of said piston-sleeve assembly slidably received within said sleeve for reciprocal sliding movement therein, said piston having a piston head at a proximal end thereof, an inlet port in said piston head providing liquid communication to said at least one outlet opening, and at least one axially extending flexible arm connected to said piston head at a proximal end of said arm and having a flow control pad on the distal end of said arm, said pad being in sliding engagement with an inside surface of said sleeve and being axially in-line with said outlet opening, and having size large enough to completely block said outlet opening;
    (e) sealing the space between said sleeve and said piston;
    (f) biasing said at least one pad into contact with said inside wall surface of said sleeve; and
    (g) spring-biasing said piston toward the proximal end of said piston-sleeve assembly.

2. The method as recited in claim 1 wherein said biasing step comprises flexing said pad and arm radially inwardly to fit inside of said sleeve whereby said arm exerts a radially outward force on said pad biasing said pad against said sleeve.

3. The method as recited in claim 1 wherein said sealing step comprises providing a rolling diaphragm having a first annular sealing bead on a proximal end thereof seated in an annular groove on said piston, and a second annular sealing bead on a distal end thereof seated in an annular groove in said sleeve.

* * * * *